Figure 1:
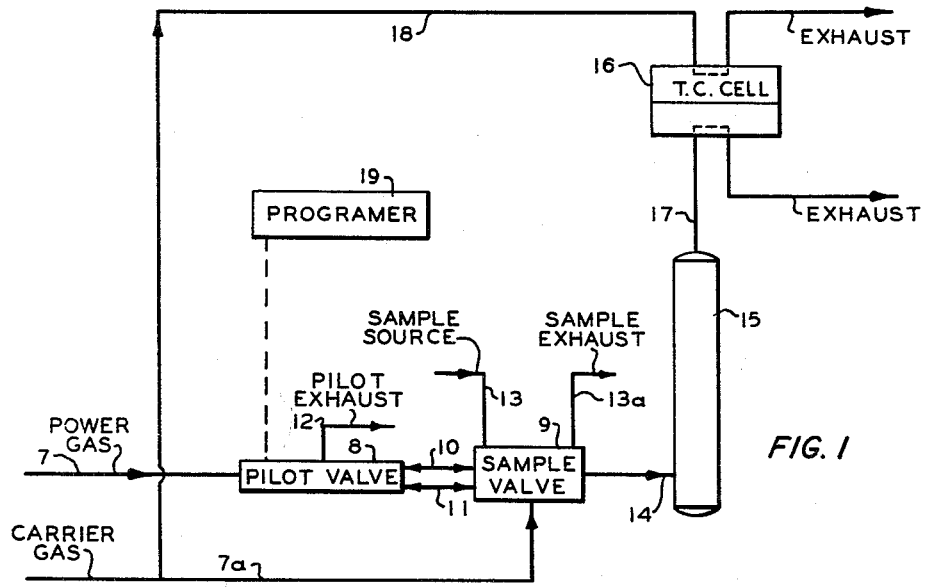

April 6, 1965  E. GUENTHER  3,176,516
ELECTROMAGNETIC MULTIPORT VALVE
Filed Dec. 11, 1959  6 Sheets-Sheet 1

INVENTOR.
EMMERICH GUENTHER
BY Hudson and Young
ATTORNEYS

INVENTOR.
EMMERICH GUENTHER
BY Hudson and Young
ATTORNEYS

April 6, 1965  E. GUENTHER  3,176,516
ELECTROMAGNETIC MULTIPORT VALVE
Filed Dec. 11, 1959  6 Sheets-Sheet 3

INVENTOR.
EMMERICH GUENTHER
BY Hudson and Young
ATTORNEYS

April 6, 1965 E. GUENTHER 3,176,516
ELECTROMAGNETIC MULTIPORT VALVE
Filed Dec. 11, 1959 6 Sheets-Sheet 4

INVENTOR.
EMMERICH GUENTHER
BY Hudson and Young

ATTORNEYS

April 6, 1965　　　E. GUENTHER　　　3,176,516
ELECTROMAGNETIC MULTIPORT VALVE
Filed Dec. 11, 1959　　　6 Sheets-Sheet 5

INVENTOR.
EMMERICH GUENTHER
BY Hudson and Young

ATTORNEYS

April 6, 1965     E. GUENTHER     3,176,516
ELECTROMAGNETIC MULTIPORT VALVE
Filed Dec. 11, 1959     6 Sheets-Sheet 6
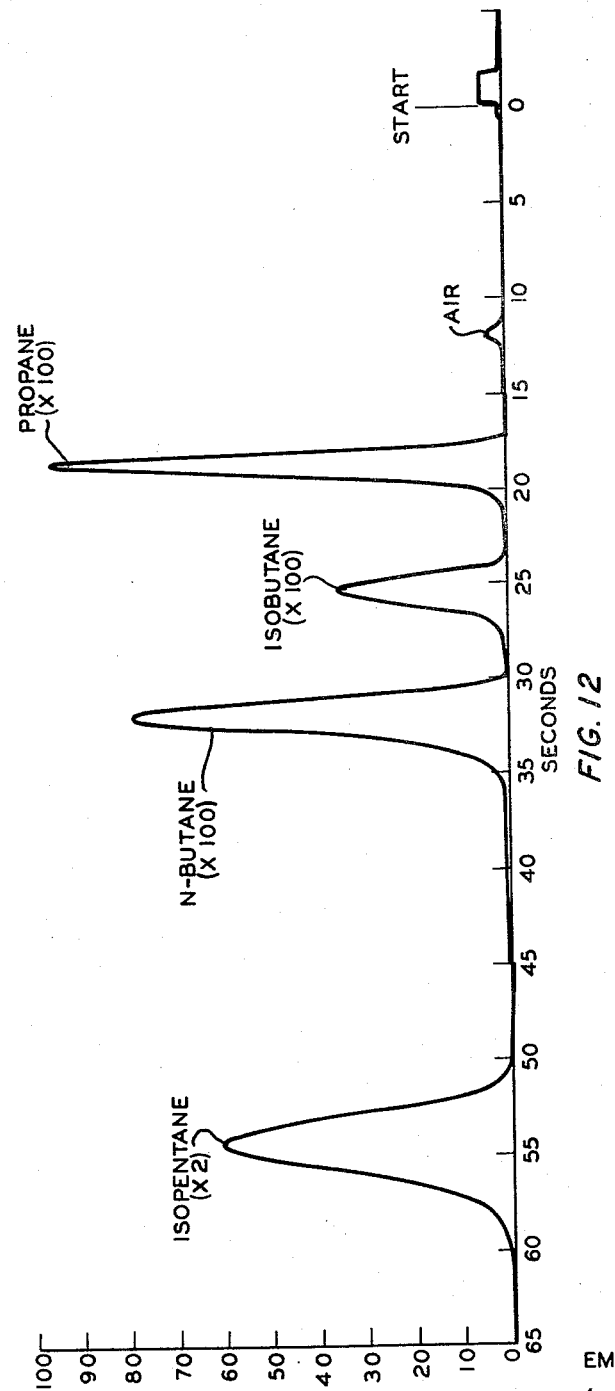
INVENTOR.
EMMERICH GUENTHER
BY Hudson and Young ELECTROMAGNETIC MULTIPORT VALVE
Emmerich Guenther, Bartlesville, Okla., assignor to Phillips Petroleum Company, a corporation of Delaware
Filed Dec. 11, 1959, Ser. No. 858,997
3 Claims. (Cl. 73—422)

This invention relates to a valve mechanism. In one aspect it relates to a multiport selector valve. In still another aspect it relates to a fast response, small internal volume, pilot valve for operating a gas-pressure control instrument. In one of its more specific aspects this invention relates to a pilot valve for operating a diaphragm sample valve in a chromatographic analyzer.

Adsorption chromatography is a known method for analyzing fluid samples by preferential adsorption and desorption. In adsorption chromatography a column containing appropriate adsorbent, usually in granular form, is used to separate the various components of a fluid sample. The fluid can be either gases or liquids although most analyses are conducted on gaseous samples. The gas sample is usually introduced to the column as a slug of sample gas in a stream of carrier gas which passes continuously through the column. Under the conditions of the analysis the various components of the sample are selectively adsorbed and then selectively desorbed by the continuing stream of carrier gas so that the various components of the sample pass out of the column sequentially where their presence and relative concentration can be detected by appropriate sensing means. Various means for sensing the components of a sample according to their characteristic properties include analyzers adapted to detect and record such properties as thermoconductivity, density, refractive index, infrared absorption, and the like.

The desirability of using chromatography for such specific uses as fractionator (multistage distillation) control has been recognized for some time. Certain features of process chromatography, such as specific measurement, high sensitivity and simplicity of operation make this type of analyzer very attractive for use in automatic process control. There are, however, some apparently inherent features of chromatography which have appeared to be obstacles in adapting chromatography to widespread use in process control. The first of these features is the fact that the indication of the amount of the key component is noncontinuous. It is of momentary duration at the time of elution from the chromatographic column, in contrast to the continuous signal which can be obtained from other process analyzers. Another feature of chromatography which has presented an obstacle to wide use of this type of analyzer is the fact that the chromatographic analysis time is long. Ordinarily, analysis time cycles range from 10 to 30 minutes, which may be adequate for some purposes but is often inadequate for close control of a process operation.

Figure 7:
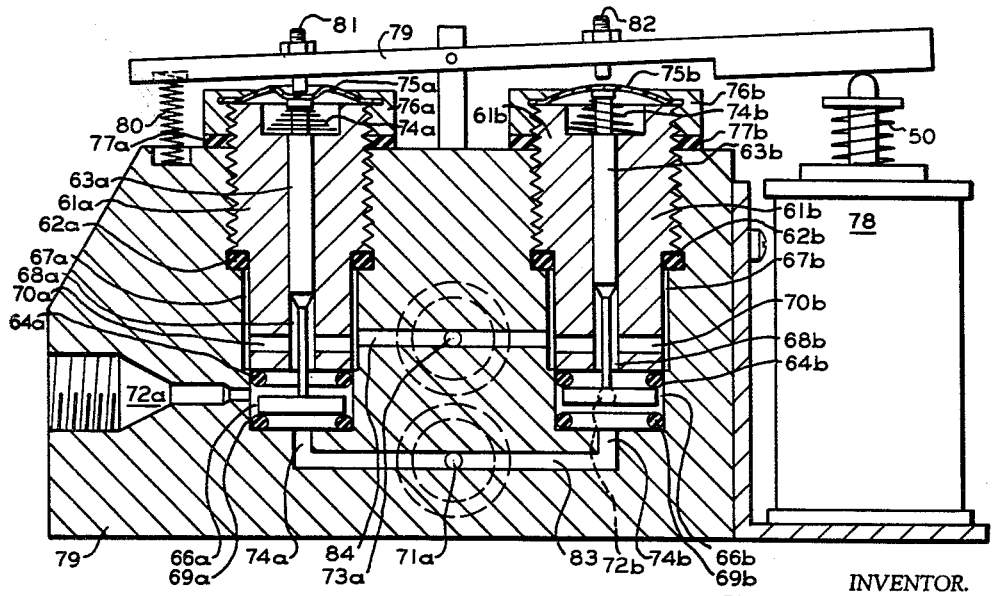
Figure 2:
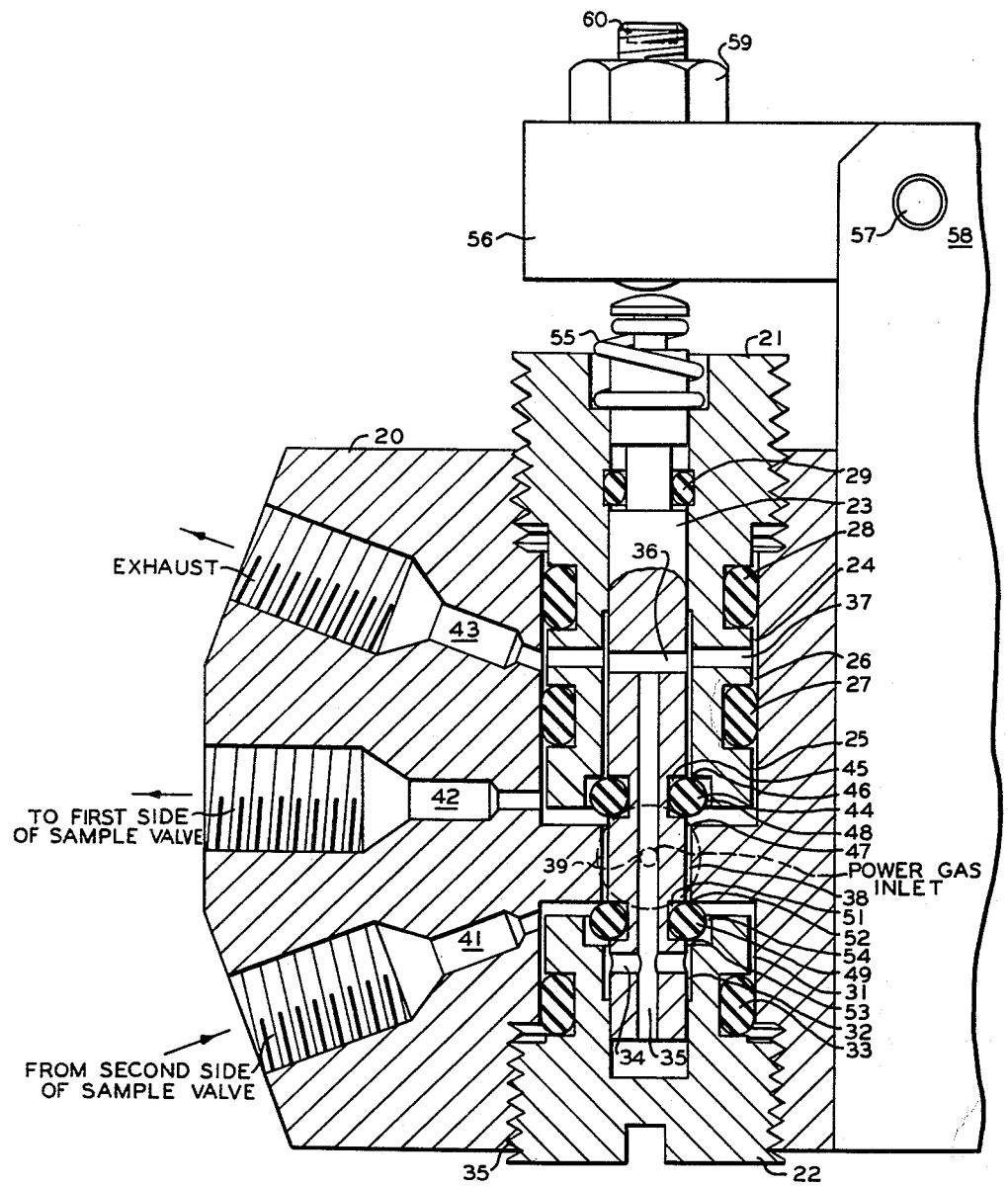
Figure 3:
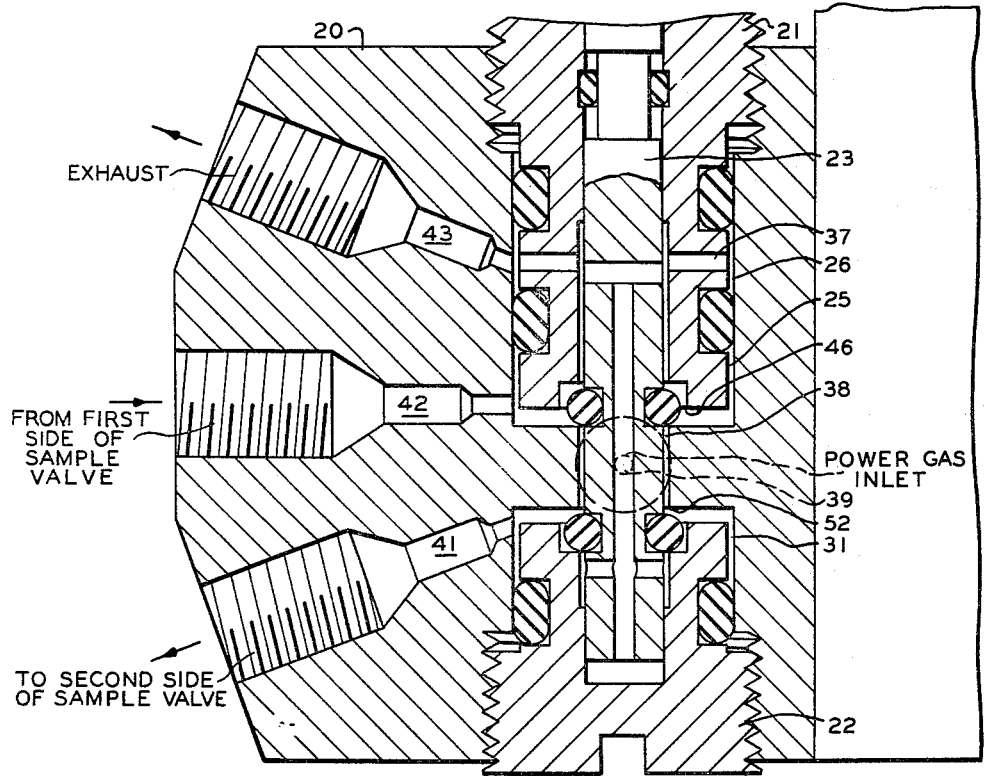
Figure 5:
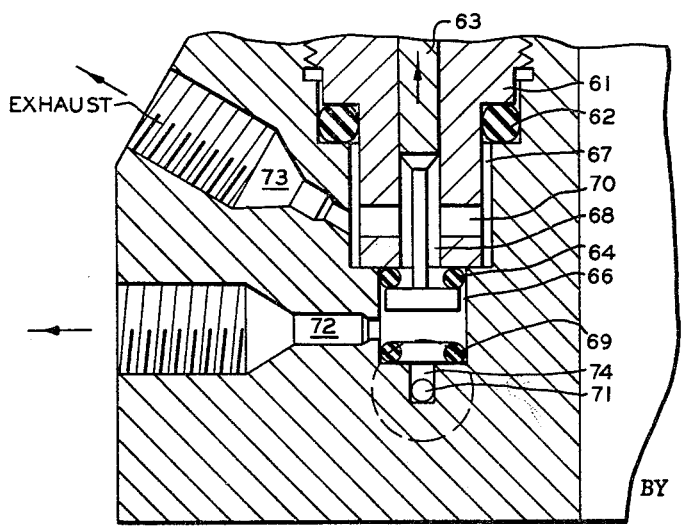
Figure 4:
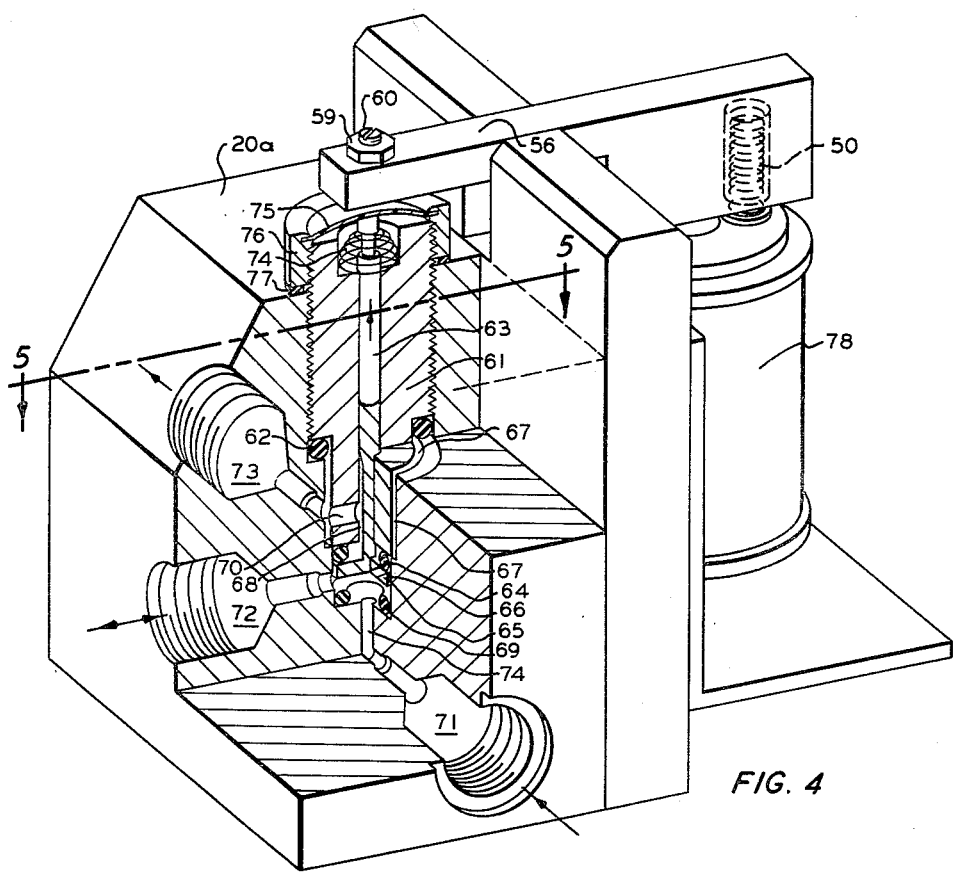
Figure 6:
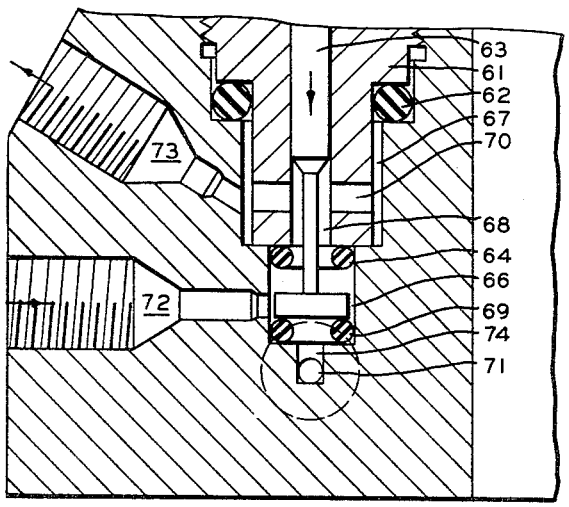
Figure 8:
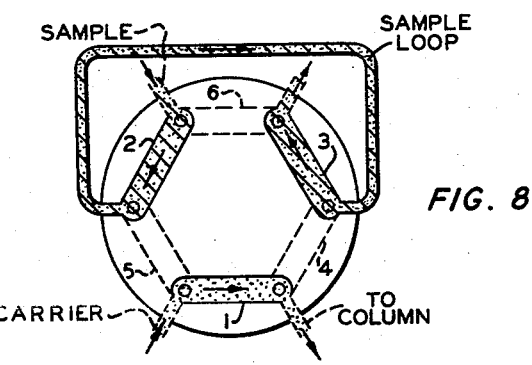
Figure 9:
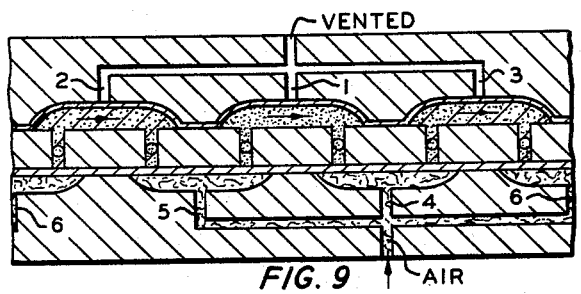
Figure 10:
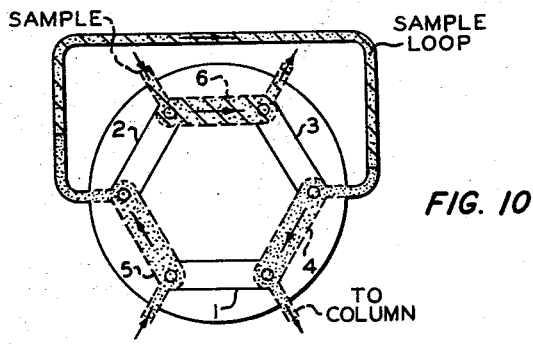
Figure 11:
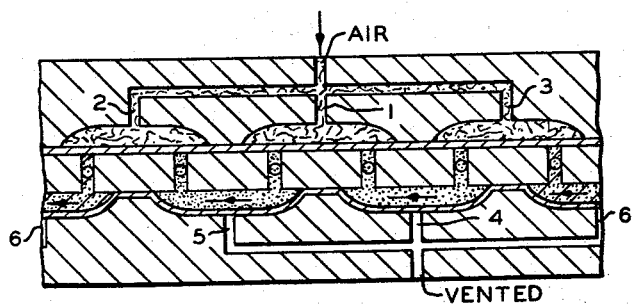

It is an object of the present invention to provide a pilot valve for use in chromatographic analysis whereby the analysis time cycle can be reduced substantially. It is also an object of this invention to provide a fast response, small internal volume, multiport selector valve. Another object of this invention is to provide a multiport valve having few moving parts which can be employed in continuous service over long periods of time with a minimum of service or repairs. It is also an object of this invention to provide a fast response, small internal volume, multiport selector valve for operating a diaphragm sample valve in a chromatographic analyzer. Other objects, features and advantages of this invention will be apparent to one skilled in this art upon study of this disclosure, including the detailed description of the invention and the appended drawing wherein:

FIGURE 1 is a simplified flow sheet of a chromatographic analyzer in which the valve of this invention is used as the pilot valve;
FIGURE 2 is a cross-sectional elevation of a 4-way selector valve of this invention with the piston elevated;
FIGURE 3 is a view of the valve of FIGURE 2 with the piston depressed;
FIGURE 4 is a perspective view, partly in cross-section, of a 3-way selector valve according to the invention;
FIGURE 5 is an enlarged sectional view along line 5—5 of FIGURE 4;
FIGURE 6 is a view of FIGURE 5 with the valve piston in depressed position;
FIGURE 7 is a cross-sectional elevation of a double-barreled valve according to the invention;
FIGURE 8 is a diagrammatic plan view of a diaphragm valve, in one position, which can be operated by the valve of this invention;
FIGURE 9 is a sectional elevation of the valve of FIGURE 8;
FIGURE 10 shows the valve of FIGURE 8 in the other position;
FIGURE 11 is a sectional elevation of the valve of FIGURE 10; and
FIGURE 12 is a graphic illustration of an analysis made with the analyzer of FIGURE 1.

The multiport selector valve of this invention makes it possible to operate a chromatographic analyzer on cycles of one minute or less and thus makes possible a substantially continuous measurement of the key component in a process stream. Thus, the valve of this invention makes it possible to utilize a chromatographic analyzer for process control.

Reference is now made to the drawing and particularly to FIGURE 1 wherein a power gas, such as air, passes via conduit 7 to pilot valve 8 wherein the gas stream is directed to a first side of diaphragm sample valve 9 via conduit 10. The second side of sample valve 9 is vented via conduit 11, pilot valve 8 and conduit 12. A carrier gas, such as helium or hydrogen, is passed via conduit 7a and valve 9 through column 15. A gas sample, introduced to sample valve 9 via conduit 13 is trapped in sample valve 9 and is passed, along with the carrier gas, via conduit 14, to sorption column 15 where constituents of the sample to be identified and measured are absorbed or adsorbed, depending upon the nature of the contact material, and are then selectively desorbed by a continuing flow of carrier gas. The sorption column effluent passes through an analyzer indicated as thermal conductivity cell 16 via conduit 17. The output signal from detector 16 is passed to a recording instrument (not shown) which can be a conventional strip chart recorder. A stream of carrier gas is passed via conduit 18 through detector 16 so as to balance out the effect of the carrier gas in the column 15 effluent. The gas to be analyzed generally flows continuously through conduit 13 and the gas, except for the samples selected for analysis, is exhausted via conduit 13a.

Pilot valve 8 is actuated by programmer 19 which can be operated by a time cycle or other means. Each time pilot valve 8 is switched, a measured sample is trapped in sample valve 9 and passed through column 15 for analysis. Thus, when pilot valve 8 is changed from the previously described position, the carrier gas passes to the second side of sample valve 9 via conduit 11 collecting the sample trapped therein and carrying same to column 15 via conduit 14. The first side of sample valve 9 is vented via conduit 10, pilot valve 8 and conduit 12.

FIGURE 2 illustrates a 4-way selector valve embodiment of this invention and is applicable for use as the pilot valve 2 of FIGURE 1. The valve body 20 is perforated and threaded to receive bushings 21 and 22. Bushings 21 and 22 are perforated to receive piston 23, shown in elevated position. Bushing 21 is sized to provide annuli 24 and 25 between the bushing and valve body 20 and annulus 26 between the bushing and piston 23. O-ring 27 separates annulus 24 from annulus 25 and O-ring 28 seals annulus 24 from the threaded connection between the body 20 and bushing 21. O-ring 29 provides a seal between piston 23 and bushing 21. Bushing 22 is sized to provide an annulus 31 between valve body 20 and bushing 22 and an annulus 32 between piston 23 and bushing 22. O-ring 33 provides a seal between annulus 31 and the threaded connection between valve body 20 and bushing 22. Passageway 34 in piston 23 communicates with annulus 32 and with passageway 35 in piston 23. Passageway 36 in piston 23 communicates with passageway 35 in piston 23 and passageway 37 in bushing 21 which, in turn, communicates with annulus 24. The piston 23 is sized to provide annulus 38 between the piston 23 and valve body 20. A power gas inlet 39 communicates with annulus 38 and is adapted to communicate with a source of power gas (not shown) such as the carrier gas of FIGURE 1. The internal volume of the valve of the invention is very small so that if compressed air is not available as power gas, the carrier gas can be used because such a small volume of gas is required.

Inlet 41 communicates with annulus 31 and can communicate with one side of a diaphragm valve (not shown) which can be valve 9 of FIGURE 1. Inlet 42 communicates with annulus 25 and can communicate with the other side of a valve such as valve 9 of FIGURE 1. Outlet 43 communicates with annulus 24 and can be open to the atmosphere or connected to an exhaust system if such is desired.

O-ring 44 is positioned in recess 45 of piston 23 so as to move with piston 23 and make sealing contact with valve seat 46 when in elevated position (as shown) and with valve seat 47 when in depressed position. Deformation of O-ring 44 is not sufficient to close annulus 48.

O-ring 49 is positioned in recess 51 of piston 23 so as to move with piston 23 and make sealing contact with valve seat 52 when in elevated position (as shown) and with valve seat 53 when in depressed position. Deformation of O-ring 49 is not sufficient to close annulus 54.

Piston 23 is maintained normally in elevated position (as shown in FIGURE 2) by spring 55 and is depressed against compression of spring 55 by rocker arm 56 pivoted at 57, supported by support 58, and actuated by the spring of a spring biased solenoid (not shown) such as that shown in FIGURE 7.

The extent of travel of piston 23 is controlled by bolt 60 and lock nut 59.

The flow through the valve as shown in FIGURE 2 will now be described. The power gas, the gas provided by the valve to operate an instrument such as a diaphragm valve, enters via conduit 39 to annulus 38 from whence it travels past valve seat 47 to annulus 25 and out through port 42 to the first side of the diaphragm valve. The power gas which is trapped in the second side of the diaphragm valve is vented by way of port 41, to annulus 31, then past valve seat 53 to annulus 32, then through puassageways 34, 35, 36 and 37 to annulus 24 and then is exhausted through port 43.

The 4-way selector valve of FIGURE 2 is shown with the piston in depressed position in FIGURE 3. Since the elements shown in these two views of the valve are identical, only those necessary for a description of the flow through the valve will be numbered in the view of FIGURE 3.

The power gas enters through inlet 39 to annulus 38, then flows past valve seat 52 to annulus 31 and then out through port 41 to the second side of the diaphragm valve referred to in the description of FIGURE 2. The gas which was trapped in the first side of the diaphragm valve passes through port 42 to annulus 25, then past valve seat 46 to annulus 26 and then through passageway 37 to port 43 where it is exhausted.

A 3-way selector valve constructed according to the invention is shown in FIGURE 4 wherein the valve body 20a is perforated to receive bushing 61 and O-rings 62, 64 and 69. Bushing 61 is perforated to receive piston 63. Piston 63 has a disc 65 attached to the end within the valve body 20a and adapted to co-operate with O-rings 64 and 69. The disc 65 is sized to provide an annulus 66 between the disc and the valve body 20a. The bushing 61 is sized to provide an annulus 67 between the bushing 61 and the valve body 20a. Piston 63 is reduced in diameter for a portion of its length to provide annulus 68 which communicates with passageway 70 in bushing 61.

Port 71 communicates with the interior of valve body 20a via passageway 74; port 72 communicates with the interior of the valve via annulus 66; and port 73 communicates with the interior of the valve via annulus 67.

Piston 63 is maintained normally in elevated position by spring 74 when solenoid 78 is energized and leakage of gas around piston 63 is prevented by diaphragm 75 secured in cap 76 which is threaded onto bushing 61 in sealing contact with gasket 77. The piston is depressed by spring 50 against the compression of spring 74 by bolt 60 in rocker arm 56 when solenoid 78 is de-energized.

The operation of the valve of FIGURE 4 will be described with reference to FIGURE 5 wherein piston 63 is in elevated position as also shown in FIGURE 4. Power gas enters via port 71 and passageway 74 and passes via port 72 to the instrument being controlled. Disc 65 is in sealing contact with O-ring 64 and no gas passes into annulus 68. Gas pressure will be maintained on the instrument being controlled so long as the valve is in the position shown in FIGURE 5.

When solenoid 78 is de-energized and rocker arm 56 is moved by the action of spring 50 so as to depress piston 63, the valve is placed in the position shown in FIGURE 6. In this position power gas is prevented from passing through the valve by disc 65 making sealing contact with O-ring 69. Gas which was trapped in the instrument is vented by passing through port 72 to annulus 66 and then by way of annulus 68, passageway 70 and annulus 67 to port 73 where it is exhausted to the atmosphere or appropriate exhaust system.

A 4-way selector valve employing two pistons is illustrated in cross section in FIGURE 7 wherein two valve assemblies, substantially identical to that of FIGURES 4, 5 and 6, are coupled together in body 79 so as to alternate in elevated and depressed positions. Elements which are common with those of FIGURES 4, 5 and 6 are identified by similar numerals accompanied by a letter. The pistons 63a and 63b are operated alternately by rocker arm 79 which is actuated by spring 50a of spring actuated solenoid 78 which overcomes the compression of spring 80 when solenoid 78 is energized. Adjustable bolts 81 and 82 control the travel distance of pistons 63a and 63b.

The operation of each valve mechanism is the same as that of FIGURES 4, 5 and 6; the power gas entering via a common passageway 83 and the exhaust being removed via a common passageway 84.

FIGURES 8 to 11 show, diagrammatically, the operation of a diaphragm sampling valve which can be operated advantageously by the pilot valve of this invention. The valve is shown as operated by air as the power gas although the pilot valve will often be operated by the carrier gas because it is available and a very small quantity is used.

The paths traveled by the sample gas and the carrier gas are shown in FIGURE 8. FIGURE 9 shows carrier gas passing through the two center ports and sample gas passing through the four outer ports. Pressure is applied to the lower side of the valve and the upper side is vented.

When the sample valve is switched, the paths traveled by the sample gas and the carrier gas are shown in FIGURE 10. FIGURE 11 shows carrier gas passing through the four center ports, trapping the sample of gas in the sample loop and carrying it to the column. The sample gas stream is vented through the two outer ports. Pressure is applied to the upper side of the valve and the lower side is vented.

FIGURE 12 shows the results of analyzing a sample of hydrocarbon gas using helium as carrier gas. The analysis requires only one minute and using the peak height method for converting the data shows that the sample contained approximately 46 mol percent propane, 17 mol percent isobutane and 37 mol percent normal butane. The combined air and isopentane amounted to less than one mol percent of the sample.

Due to the extremely small internal volume of the valve of this invention the piston travel is extremely short, and a small amount of pressure applied to the O-rings is sufficient to provide a complete seal and the O-rings are thus flexed a minimum in the operation of the valve. The O-rings are made of rubber such as natural rubber, neoprene rubber, butadiene-styrene rubber, or other elastic material. The life of the O-rings is exceedingly long and the valve can normally be operated for several million cycles without requiring service or attention.

Although the valve is described as applied to a chromatographic analyzer it is not limited thereto but can be employed in any situation where a multiport selector valve is indicated.

Reasonable variations and modifications are possible within the scope of this disclosure without departing from the spirit and scope of the invention.

That which is claimed is:

1. A 2-position, multiple-port pilot valve comprising a valve body having a pair of parallel bores extending partly therethrough; a power fluid passageway connecting the termini of said bores; a power fluid port in communication with said power fluid passageway; a first elastic O-ring positioned in the terminus of each bore; an exhaust passageway connecting said bores; an exhaust port in communication with said exhaust passageway; an inlet-outlet port communicating with each bore intermediate said exhaust passageway and said power fluid passageway; a bushing positioned in each of said bores and terminating intermediate said exhaust passageway and said inlet-outlet ports; a passageway communicating with the interior of said bushing and said exhaust passageway; a second elastic O-ring positioned in said bore adjacent the end of said bushing; a piston rod positioned in said bushing so as to provide an annulus between said rod and said bushing; a piston comprising a disc having a diameter greater than the inside diameter of said O-rings and less than the diameter of the bore connected to said piston rod intermediate said O-rings so that when the piston is in one position it is in axially compressed sealing contact with one O-ring and when the piston is in the other position it is in axially compressed sealing contact with the other O-ring; and means to move said pistons simultaneously and alternately into axially compressed contact with said first and second O-rings so that power fluid passes to one of said bores while the other bore is exhausting.

2. A two-position multiple-port pilot valve comprising a valve body having a pair of parallel bores extending partly therethrough; a power fluid passageway connecting the termini of said bores; a power fluid port in communication with said power fluid passageway; a first elastic O-ring positioned in the terminus of each bore; an exhaust passageway connecting said bores; an exhaust port in communication with said exhaust passageway; an inlet-outlet port communicating with each bore intermediate said exhaust passageway and said power fluid passageway; a bushing positioned in each of said bores having a first end terminating outside said valve body and a second end terminating intermediate said exhaust passageway and said inlet-outlet port; a passageway communicating with the interior of each of said bushings and said exhaust passageway; a second elastic O-ring positioned in each of said bores adjacent the end of said bushing; a piston rod positioned in each of said bushings so that one end of the rod extends beyond the exterior end of said bushing and the other end terminates intermediate said O-rings and having the end portion within the valve body of decreased diameter so as to provide an annulus between said rod and said bushing adjacent the passageway communicating with the interior of said bushings; a piston comprising a disc having a diameter greater than the inside diameter of said O-rings and less than the diameter of the bore connected to each of said piston rods intermediate said O-rings so that when the piston is in a first position it is in axially compressed sealing contact with the second elastic O-ring and when the piston is in the second position it is in axially compressed sealing contact with the first O-ring; spring means connected to each of said piston rods so as to urge said piston into the first position; a flexible, impermeable diaphragm sealed to the outer end of each of said bushings so as to cover the end of each of said piston rods; and means to deform said diaphragms alternately so as to move said pistons alternately into axially compressed contact with said first and second O-rings.

3. A sample collecting device comprising a diaphragm sample valve to collect a fluid sample, and apparatus to operate said sample valve according to a predetermined time cycle comprising a spring-biased, solenoid-operated, piston-actuated pilot valve comprising a valve body having a pair of bores extending partly therethrough and having a piston operatively positioned in each bore; an inlet port in said valve body operatively connected to said stream of carrier gas and to an inlet at the terminus of each bore; a pair of ports in said valve body each of which is connected to a side of said diaphragm valve and to a separate bore in said valve body; an exhaust port in said valve body connected by a passageway to each of said bores; a pair of O-rings in each bore positioned so as to be axially and alternately compressed by said piston to close the inlet at the terminus of a first bore, to open the inlet at the terminus of the second bore so as to pass carrier gas to the second side of the diaphragm valve, to open the port connected to a first side of the diaphragm valve and to the first bore so as to connect said port and diaphragm valve to said exhaust port in said valve body when said valve is in a first position and to open the inlet at the terminus of the first bore so as to pass carrier gas to the first side of the diaphragm valve, to close the inlet at the terminus of the second bore, to open the port connected to the second side of the diaphragm valve and to the second bore so as to connect the port connected with the second side of the diaphragm valve with said exhaust port; and means to operate said solenoid according to the predetermined time cycle.

References Cited in the file of this patent

UNITED STATES PATENTS

| | | |
|---|---|---|
| 2,390,425 | Crum | Dec. 4, 1945 |
| 2,477,237 | Carr | July 26, 1949 |
| 2,608,376 | Adams | Aug. 26, 1952 |
| 2,833,151 | Harvey | May 6, 1958 |
| 2,875,606 | Robinson | Mar. 3, 1959 |
| 2,898,936 | Collins | Aug. 11, 1959 |
| 2,948,298 | Gardner | Aug. 9, 1960 |
| 2,964,938 | Fuller | Dec. 20, 1960 |
| 2,971,090 | Piet et al. | Feb. 7, 1961 |
| 3,017,772 | Wright | June 23, 1962 |

FOREIGN PATENTS

| | | |
|---|---|---|
| 1,182,564 | France | Jan. 19, 1959 |